United States Patent

Hruda

[15] 3,688,204
[45] Aug. 29, 1972

[54] ELECTRONIC POWER REGULATION CONTROL DEVICE FOR PROVIDING CONSTANT ELECTRICAL POWER TO A LOAD OF VARYING IMPEDANCE

[72] Inventor: Robert M. Hruda, Horseheads, N.Y.

[73] Assignee: Westinghouse Electric Corporation, Pittsburgh, Pa.

[22] Filed: Jan. 26, 1971

[21] Appl. No.: 109,847

[52] U.S. Cl. .................328/267, 328/249, 328/257, 328/264, 313/40
[51] Int. Cl. ..................H01j 19/82, H03k 19/82
[58] Field of Search......328/249, 252, 257, 260, 262, 328/264, 267, 268; 313/278, 40

[56] References Cited

UNITED STATES PATENTS

| | | | |
|---|---|---|---|
| 2,088,494 | 7/1937 | Swedlund | 328/268 X |
| 2,660,670 | 11/1953 | Elliot | 328/268 X |

FOREIGN PATENTS OR APPLICATIONS

| | | | |
|---|---|---|---|
| 585,452 | 12/1924 | France | 328/249 |
| 783,360 | 4/1935 | France | 328/249 |

*Primary Examiner*—John W. Huckert
*Assistant Examiner*—Andrew J. James
*Attorney*—F. H. Henson and C. F. Renz

[57] ABSTRACT

An electronic power regulation control device for providing constant electric power to a load of varying impedance. The device may be operated to provide degenerative or regenerative regulation with varying load peaks. The device does not require feedback but under certain conditions feedback may enhance the performance. The basic power regulating device is a thermionic electron device wherein the voltage-current characteristic approximates the ideal hyperbolic curve of constant power. This is accomplished by combining the characteristics of a current limiting, temperature limited thermionic diode in conjunction with that of a thermionic triode in a parallel combination. It is also possible to combine the functions of a control diode of high perveance and a control diode of low perveance to also approach a characteristic curve of constant power.

7 Claims, 8 Drawing Figures

Patented Aug. 29, 1972

Patented Aug. 29, 1972  3,688,204

ELECTRONIC POWER REGULATION CONTROL DEVICE FOR PROVIDING CONSTANT ELECTRICAL POWER TO A LOAD OF VARYING IMPEDANCE

BACKGROUND OF THE INVENTION

There are many control devices in industry utilized for controlling electric power. Most of these devices are directed to providing either a constant voltage or a constant current and are not directed to the problem of providing a regulation system that provides constant power across a varying load.

One typical application is that in dielectric heating. In such a heating system, a power supply converts AC power into DC power and delivers it to an oscillator. The oscillator generates radio frequency power that goes to the heating load. Normally, the power for such a system is controlled at the input side of the power supply. If the power level is low, a variable transformer might be used. If it is high, either an induction regulator or saturable core reactor could be used. In all of these methods, the quantity being controlled is the amount of AC current being rectified in the power supply.

Another system employs a power control diode in which the power supply is designed to produce full output when it is turned on and is not variable. The control diode is inserted between the power supply and the oscillator. The input to the diode filament controls its emission, which in turn, determines the voltage drop between the filament and anode of the diode. Thus, the diode acts as a high power resistor between the power supply and the load. Typically, a change of only four watts of filament power to the diode results in a load change of 1 kilowatt. By control of the current applied to the filament to provide a certain amount of emission current, the diode conducts essentially the same set current no matter how much the load increases. It is also possible by setting the diode to operate at the proper point past the knee of the characteristic curve to cause it to adjust its operation to suit a variety of load conditions. For example, in the drying of a foam rubber mattress by dielectric heating, the mattress contains a considerable amount of water when it first enters between the electrodes and this provides a heavy load on the dielectric heater. By the time the mattress comes out, all the water is gone and so the load on the heater is relatively light. If too much power is fed through the heater initially, rubber cells will be destroyed and steam will blow the mattress apart, yet, if the heater control is set unnecessarily low, the drying process takes longer than is necessary and therefore would restrict production rate. The problem is solved by setting the control diode so that the power supply voltage is divided between the load and the diode. As the mattress dries, the load line swings counter-clockwise and the load voltage increases as a consequence. The diode voltage decreases. By this progressive delivery of more voltage to the load as the mattress dries, a more uniform power input to the mattress is provided and the mattress dries faster than could be safely done with other control methods.

Another example of a power control diode use is in RF heating of a plastic. The plastic starts as a good insulator but as heat goes into it, it becomes more and more conductive and so the heat flows in faster ad faster. By using the control diode set at the knee of the characteristic curve, the voltage delivered to the RF generator is reduced as the plastic heats. The load line in this case will go in a clockwise direction.

SUMMARY OF THE INVENTION

This invention is directed to a power regulation device which provides constant electric power to a load whose impedance is varied. The device incorporates a current limiting function of a temperature limited thermionic diode in conjunction with a biased triode to approximate the ideal hyperbolic curve of constant power.

BRIEF DESCRIPTION OF THE DRAWINGS

For a better understanding of the invention, reference may be had to the preferred embodiments, exemplary of the invention, shown in the accompanying drawings, in which.

DESCRIPTION OF THE PREFERRED EMBODIMENTS

Figure 1:
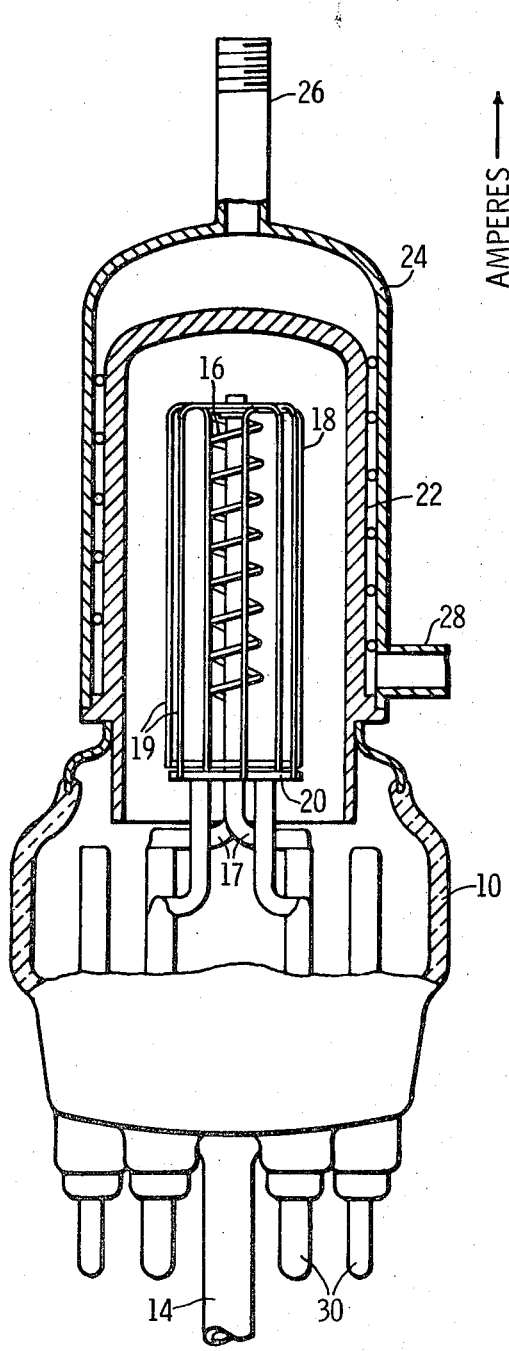
FIG. 1 is a view of a power regulation device partly in section incorporating the teachings of this invention.

Referring to FIG. 1, there is shown a power control device consisting of an envelope 10 which is evacuated by means of an exhaust tubulation 14. Positioned within the envelope 10 is a triode filament 16 which is in the form of a helical wire of a suitable material such as tungsten. The filament 16 is supported by means of a pair of support leads 17 of a suitable material such s molybdenum. Positioned about the triode filament 16 is a diode filament 18. The diode filament 18 consists of a plurality of filament strands 19 which are in the shape of hairpins and are mutually joined at the upper end and closed portion by a suitable molybdenum braze. The ends of the diode filament strands are welded to a pair of notched discs 20 of a suitable material such as molybdenum. An anode 22 which is of a suitable material such as copper forms a part of the envelope 10. A jacket 24 surrounds the anode 22 and provides means of circulating water about the outer surface of the anode 22. Inlet means 26 to the water jacket 24 provides means for introducing a suitable liquid such as water into the water jacket 24 and outlet means 28 provides means of removing the liquid from the water jacket 24. Terminals 30 are provided for applying suitable currents to the filaments 16 and 18, and an exterior contact may be made directly to the exterior surface of the anode 22.

Figure 5:
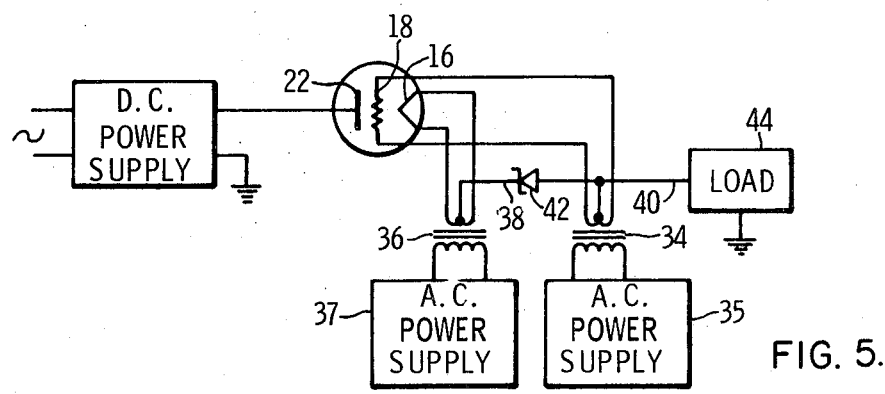
FIG. 5 is a schematic diagram of a circuit used in connection with the power regulator device illustrated in FIG. 1.

FIG. 5 illustrates the electrical connection of the power device shown in FIG. 1 into a typical circuit. A suitable power supply 32 is provided for providing direct current power. The positive terminal of the power supply 32 is connected to the anode 22. Current supplied to the diode filament 18 is provided by means of a suitable AC power supply 35 connected through a filament transformer 34. Suitable current is supplied to the triode filament 16 by means of a suitable AC power supply 37 connected through a filament transformer 36. The power supplied to the transformers 34 and 36 is variable in nature so as to provide desirable electrical characteristics of the power control device that will be explained later. A lead 38 is provided from the midpoint of the secondary of the transformer 36 which is connected to the cathode terminal of a Zener diode 42 and a lead 40 is provided from the midpoint terminal of the secondary of the transformer 34 to the anode terminal of the Zener diode 42. The anode of the Zener diode 42 is coupled to a load 44 and the other side of the load 44 is connected to ground. The Zener diode 42 may be replaced by any form of voltage source such as a battery or cathode resistor to provide a suitable bias between the filaments 16 and 18.

Figure 2:
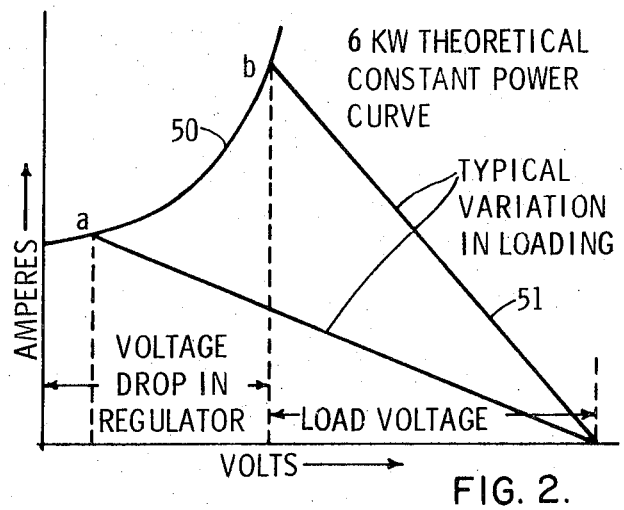
FIG. 2 illustrates a curve for a theoretical constant power regulation.

Referring now to FIG. 2, a theoretical constant power curve is illustrated by the curve 50. If the load line 51 of the system as is illustrated in FIG. 2 is at point $b$, then the distribution of voltage between the power control device and the load is as indicated. In the event that the load line 51 should vary in a counterclockwise direction so as to intersect the curve 50 at point $a$, then the voltage drop across the power control device would be small while the voltage across the load would be large. In either case, the power across the load would be constant.

Figure 3:
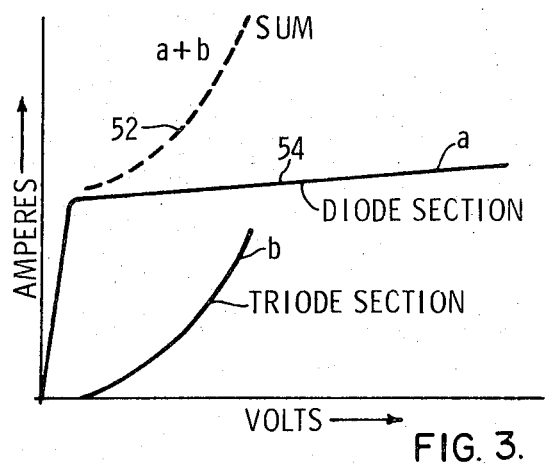
FIG. 3 illustrates curves of the properties of the device shown in FIG. 1 to accomplish substantially a theoretical constant power control.

FIG. 3 illustrates the two functions of the power control device that provides an electrical characteristic illustrated as curve 52 in FIG. 3. The electrical characteristic curve 52 is obtained by combining the electrical properties of the diode section consisting of the filament 18 and the anode 22 to provide curve 54 and the electrical characteristics of the triode section including the filament 16, the anode 22 and the grid function of the filament 18 to provide the curve 56. The term control diode as used herein is characterized by the curve 54 in FIG. 3. This curve 54 may be expressed mathematically as follows:

In the region extending from the origin to point 1 the curve is termed "space charge limited," and obeys the classical 3/2 power law:

$$I = KV^{3/2}$$

where
 $I$ is anode current
 $K$ is a constant determined by geometry
 $V$ is anode voltage.

In the region extending from 1 to the right the curve 54 is termed "temperature limited," and obeys Dushman's and Schottky's equations:

$$I = I_s \exp(4.389 E^{1/2}/T)$$

$$I_{st} = AT^2 \exp(-b_0/T)$$

where
 $I$ is again anode current
 $I_s$ is peak emission current
 $E$ is the electrostatic field on the emitter
 $T$ is temperature
 $A$ and $b_0$ are physical constants determined by the emitter material Exp denotes epsilon raised to the indicated power. A description is found on p. 8–14 and 109–110 in Physics of Electron Tubes by Koller.

Figure 4:
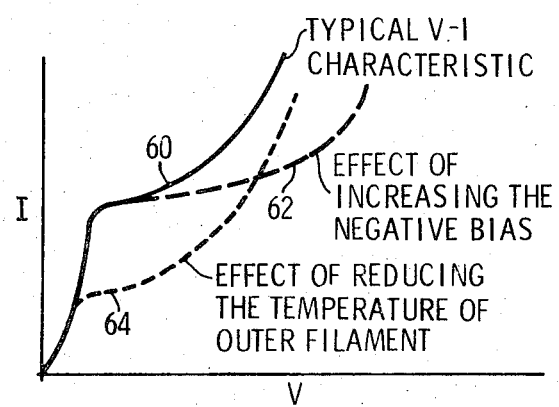
FIG. 4 is another illustration of the change in operating characteristics of the device shown in FIG. 1 in response to appropriate control potentials applied to the electrodes.

In FIG. 4 there is illustrated a typical electrical characteristic curve 60 of a power control device. By increasing the negative bias between the filaments 16 and 18, one is able to modify the electrical characteristics to the curve 62. This may be accomplished by providing a variable power supply in place of the Zener diode 42. In addition, by reducing the temperature of the filaments 18 one can modify substantially the characteristics of the tube so as to obtain a curve similar to curve 64 as illustrated in FIG. 4. In this manner, by providing separate control of the temperature of the filaments 16 and 18 and the application of bias therebetween, a wide range of controlled power characteristics may be obtained from the power control device.

Figure 6:
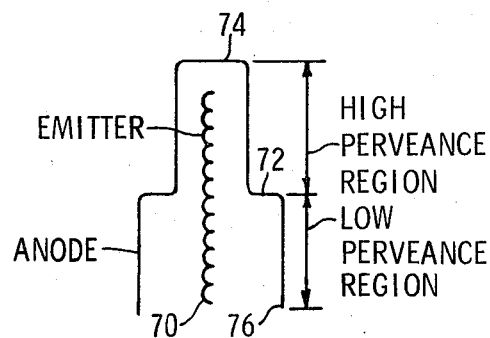
FIG. 6 is a view illustrating a possible modification of the device shown in FIG. 1 and incorporating the teachings of this invention.

In FIG. 6 there is illustrated another possible modification to provide a substantial constant power control characteristics in which a common elongated filament 70 is utilized and in which the anode 72 consists of a section 74 having a small diameter and a second section 76 having a larger diameter. In this manner the anode region associated with the anode 76 is a low perveance region while the anode region associated with the anode portion 74 is the high perveance region.

Figure 7:
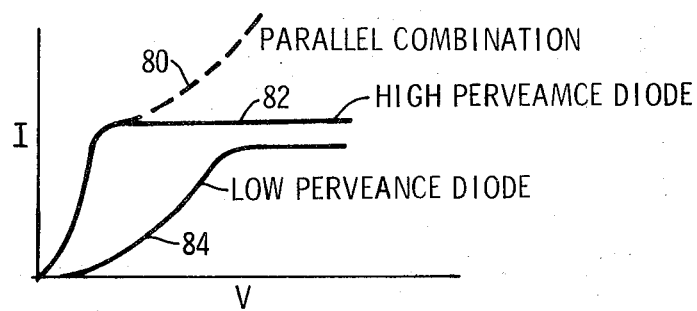
FIG. 7 is a set of curves illustrating the electrical properties of the device shown in FIG. 6.

FIG. 7 illustrates the electrical characteristics obtained by such a device in which the connection of the device in parallel combination provides the curve 80 while the high perveance diode portion 74 provides a curve 82 and the low perveance diode section provides the curve 84.

Figure 8:
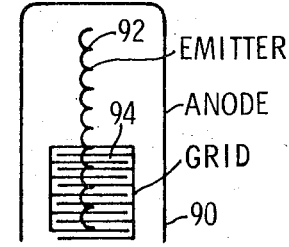
FIG. 8 illustrates another possible modification of the device shown in FIG. 1 incorporating the teachings of this invention.

In FIG. 8 another possible modification is illustrated which consists of an anode of uniform diameter 90, a common emitter 92, and a grid member 94 which extends only for a portion of the length of the anode 90 and the emitter 92.

I claim as my invention:

1. A power control device comprising a first and second electrical discharge means in which said first means operates in the temperature limited region of a diode electrical characteristic and said second means operates in a triode electrical characteristic and terminal means for applying power through said power control device to a load, said first and second means of said device connected in electrical parallel to provide in combination an electrical characteristic corresponding to a substantially uniform power control electrical characteristic with varying loads.

2. The device of claim 1 in which said first means is an electrical discharge control diode and said second means is an electrical discharge triode.

3. The device as set forth in claim 1 in which said first means is an electrical discharge control diode of high perveance and said second means is an electrical discharge control diode of low perveance.

4. The device as set forth in claim 3 in which said first and second second means are within a common envelope and have a common emitter.

5. The device as set forth in claim 2 in which said first and second means have a common emitter and a common anode.

6. The device as set forth in claim 1 in which said first means consists of a first filament, said second means consists of a second filament surrounding said first filament with a bias provided between said first and second filaments, and a common anode for said first and second means.

7. The device set forth in claim 6 in which said means for applying power is connected to said anode and said load is connected to said first and second filaments.

* * * * *